United States Patent
Brinkman (10) Patent No.: US 6,865,842 B2
(45) Date of Patent: Mar. 15, 2005

(54) FISH CATCHING SYSTEM (75) Inventor: Stephen M. Brinkman, Beeville, TX (US)

(73) Assignee: S&C Brinkman Corp., Beeville, TX (US)

(*) Notice: Subject to any disclaimer, the term of this patent is extended or adjusted under 35 U.S.C. 154(b) by 0 days.

(21) Appl. No.: 10/256,222

(22) Filed: Sep. 26, 2002

(65) Prior Publication Data

US 2003/0074829 A1 Apr. 24, 2003

Related U.S. Application Data (63) Continuation-in-part of application No. 10/017,578, filed on Dec. 14, 2001, now abandoned, which is a continuation-in-part of application No. 09/819,584, filed on Mar. 28, 2001, now Pat. No. 6,505,432, which is a continuation-in-part of application No. 09/745,235, filed on Dec. 20, 2000, now Pat. No. 6,571,508.

(51) Int. Cl.[7] ............................................. A01K 85/00
(52) U.S. Cl. ...................................... 43/42.36; 43/42.02
(58) Field of Search ............................... 43/42.36, 42.02

(56) References Cited

U.S. PATENT DOCUMENTS

| | | | | |
|---|---|---|---|---|
| 2,663,964 A | | 12/1953 | Martin ...................... 43/42.02 |
| 2,770,063 A | | 11/1956 | Martin ...................... 43/42.02 |
| 4,771,567 A | * | 9/1988 | Cannon ..................... 43/42.26 |
| 5,228,230 A | | 7/1993 | Vaught ...................... 43/42.26 |
| 6,505,432 B2 | * | 1/2003 | Brinkman .................. 43/42.02 |
| 2002/0073599 A1 | * | 6/2002 | Brinkman ..................... 43/4.5 |

* cited by examiner

Primary Examiner—Teri P. Luu
Assistant Examiner—Bret Hayes
(74) Attorney, Agent, or Firm—Christopher L. Makay

(57) ABSTRACT

A fish catching system includes a decapod-shaped fishing lure with a body and a tail having an aperture therethrough. The fish catching system further includes a hook securable to a fishing line. The hook passes through the aperture and engages the body of the lure such that the fishing line resides through the aperture. Alternatively, the fishing line passes through the aperture and secures to the hook, which then engages the body of the lure.

15 Claims, 5 Drawing Sheets

FISH CATCHING SYSTEM

CROSS-REFERENCE TO RELATED APPLICATIONS

This application is a continuation-in-part of application Ser. No. 10/017,578, filed Dec. 14, 2001, now abandoned, which was a continuation-in-part of application Ser. No. 09/819,584, filed Mar. 28, 2001, now U.S. Pat. No. 6,505,432 issued Jan. 14, 2003, which was a continuation-in-part of application Ser. No. 09/745,235, filed Dec. 20, 2000, now U.S. Pat. No. 6,571,508 issued Jun. 3, 2003.

BACKGROUND OF THE INVENTION

1. Field of the Invention

The present invention relates to fishing and, more particularly, but not by way of limitation, to a fish catching system including a fishing lure shaped as a decapod, worm, or the like.

2. Description of the Related Art

Many game fish sought by anglers are predators pursuing live food animals. Game fish typically maintain a set diet consisting of one or several main live food animals. Illustratively, certain game fish feed primarily on decapods, such as shrimp, crawfish, lobster, and the like. Game fish in pursuing decapods instinctively and through experience understand the characteristics of such live food animals. Consequently, during hunting, game fish search for decapod signs according to their known characteristics and, upon finding a decapod, attack and devour the decapod.

Anglers often use live bait because game fish prefer their decapod food animals alive. Although live bait can be successful, there is the disadvantage in that the bait dies quickly rendering it ineffective in attracting game fish. A dead decapod attached to a fishing line does not exhibit the characteristics normally associated with such animals, resulting in game fish ignoring the bait and a poor day of fishing.

In an attempt to replace live bait, artificial lures in the form of decapods have been developed. Unfortunately, such lures have experienced limited success because they do not present game fish with a realistic looking and acting food animal. The lures are typically not properly colored like live decapods and, further, do not exhibit the characteristics normally associated with such animals. When the lure is pulled through the water, it appears no different then a dead decapod, thereby failing to attract game fish.

Accordingly, a fishing lure shaped and colored as a decapod that, when pulled through the water, exhibits the characteristics normally associated with decapods improves over both live bait and existing artificial lures.

SUMMARY OF THE INVENTION

In accordance with the present invention, a fish catching system includes a decapod-shaped lure. The decapod-shaped lure includes a body and a tail with an aperture therethrough. The fish catching system further includes a hook with a barb and a shaft terminating in an eyelet that receives a fishing line. The fish catching system still further includes a weight mountable to the tail of the lure. In a first position, the hook secures to the body of the decapod-shaped lure and the fishing line passes through the aperture of the tail and secures to the hook. Accordingly, the pulling of the fishing line facilitates movement of the tail underneath the body to place the lure in a second position and the releasing the fishing line returns the tail to the first position of the lure. In fishing the fish catching system, a fishing line is secured to the hook, which is then passed through the aperture and secured to the body of the lure such that the fishing line resides through the aperture, thereby placing the lure in a first position. Alternatively, the fishing line passes through the aperture and secures to the hook, which then secures to the body of the lure, thereby placing the lure in a first position. Next, the lure is cast into a body of water, and the fishing line pulled to facilitate movement of the tail underneath the body thereby placing the lure in a second position. The fishing line is then released thereby returning the tail to the first position of the lure. In addition, a weight may be selected dependent upon desired fishing depth and secured to the tail of the lure.

It is therefore an object of the present invention to provide a fish catching system that simulates game fish prey motion.

It is a further object of the present invention to provide a fish catching system useable under variable fishing conditions.

Still, other objects, features, and advantages of the present invention will become evident to those of ordinary skill in the art in light of the following.

DETAILED DESCRIPTION OF THE PREFERRED EMBODIMENTS

Figure 1:
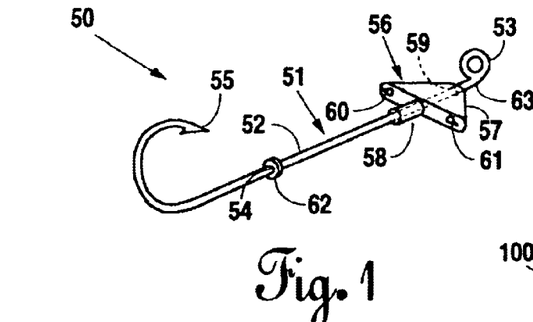
FIG. 1 is a perspective view illustrating a lure manipulator according to a first embodiment of a fish catching system.
Figure 7:
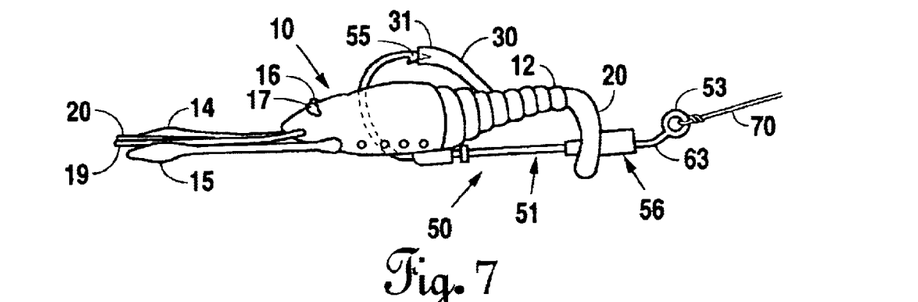
FIG. 7 is a side elevation view illustrating a lure manipulator according to a first embodiment of a fish catching system, including a lure.
Figure 9:
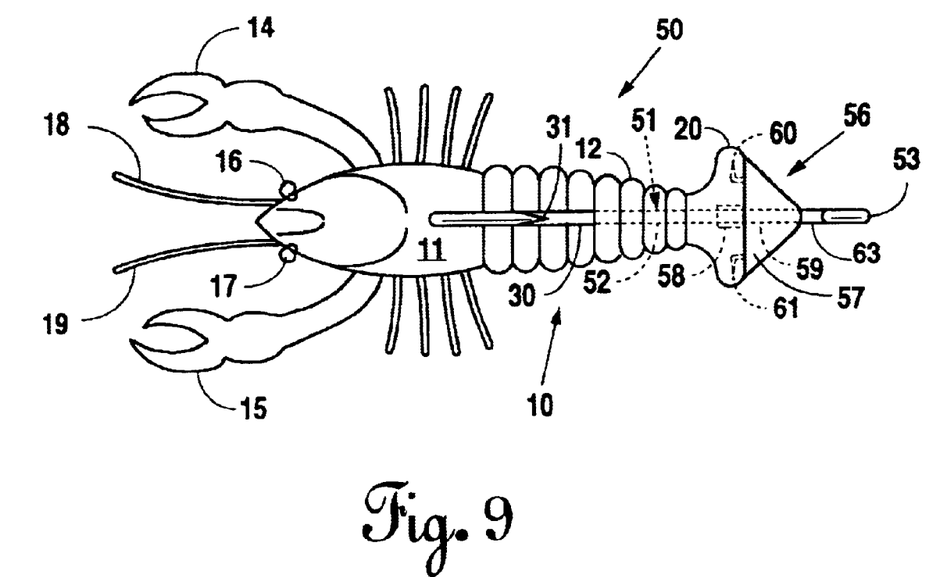
FIG. 9 is a top plan view illustrating a lure manipulator according to the first embodiment of the fish catching system.

As illustrated in FIGS. 1, 7, and 9, a first embodiment of a fish catching system 50 includes a hook 51 having a shaft 52 terminating in an eyelet 53 at a first end and a curvature 54 terminating in a barb 55. Although this embodiment discloses a hook 51 including a single barb 55, those of ordinary skill in the art will recognize that any hook, such as a treble hook, may be substituted.

The fish catching system 50 further includes a lure manipulator 56. The lure manipulator 56 includes a lure retainer 58, a head 57 secured to or formed integrally with the lure retainer 56, and a passageway 59 through the head 57 and the lure retainer 58. The lure manipulator 56 may further include lure-retaining posts 60 and 61 secured to or integrally formed with the head 57. The passageway 59 permits the lure manipulator 56 to reside about the shaft 52 of the hook 51. The lure manipulator 56 secures about shaft 52 during the manufacturing process of the fish catching system 50 using any of several well-known techniques. However, other means of securing may include a slot along the axis of the lure manipulator 56 into which the hook 51 is placed such that, when the lure manipulator 56 is squeezed, the constriction of the slot secures the lure manipulator 56 about the shaft 52 of the hook 51. The passageway 59 is sized such that the lure manipulator 56 slides freely along the shaft 52 of the hook 51. The lure retainer 56 may include any device, such as concentric flanges, a barb, or other detent, that receives a lure thereon but prevents dislodgement of the lure during the use of the lure manipulator 56. The lure manipulator 56 may be constructed from any suitable material, such as lead, metal, hard plastic, or the like.

In this first embodiment, a bend 63 just prior to the eyelet 53 of the shaft 52 prevents movement of the lure manipulator 56 towards the eyelet 53 during use of the lure manipulator 56. The bend 63 in this embodiment curves the same direction as the curvature 54, such that when a user pulls a line attached to the eyelet 53 the fish catching system 50 is kept or returned to a position that allows the proper operation of the lure manipulator 56. Similarly, a collar 62 prevents movement of the lure manipulator 56 beyond a predetermined point on the shaft 52 of the hook 51 and also prevents movement of a lure that is secured to the shaft 52 along the shaft 52.

In this first embodiment, the head 57 is triangle shaped and is weighted to permit sinking of the fish catching system 50. Although the first embodiment discloses the lure manipulator 56 as sliding freely along the shaft 52 of the hook 51, those of ordinary skill in the art will appreciate that under certain fishing conditions it may be desirable to have the lure manipulator 56 fixed permanently to the shaft 52.

The fish catching system 50 in this first embodiment further includes a lure 10 that provides both the proper shape and coloring exhibited by a decapod, such as a shrimp, crawfish, lobster, and the like. The lure 10 in this first embodiment is constructed from soft plastic or any suitably malleable material.

The lure 10 includes a body 11 and a tail 12. The body 11 includes claws 14 and 15 and antennae 18 and 19, which are both formed integrally at a front portion thereof. The body further includes eyes 16 and 17 attached at a front portion of thereof. The tail 12 includes a tail fan 20 formed integrally at the rear thereof. The body 11 and the tail 12, including the claws 14 and 15, antennae 18 and 19, and the eyes 16 and 17, provide the lure 10 with a shape identical to a decapod. Further, the color of the body 11 and the tail 12, including the claws 14 and 15, antennae 18 and 19, and the eyes 16 and 17, resemble that of a decapod or any other color scheme suitable to attract game fish.

The lure 10 further includes a barb guard 30 formed integrally with lure 10. The barb guard 30 includes an end portion 31 that allows for the sheathing of the barb 55. The barb guard 30 therefore covers the barb 55 to prevent the hook 51 from snagging on underwater plants and debris common in places where game fish hide.

In use, an angler attaches a fishing line 70 supported on a rod and reel to the eyelet 53 of the hook 51. The angler then drives the lure retainer 58 of the lure manipulator 56 through the tail fan 20 of the lure 10. The angler further inserts the lure-retaining posts 60 and 61 of the lure manipulator 56 through the tail fan 20 of the lure 10. Next, the angler inserts the hook 51 through the body 11 of the lure 10 starting underneath the body 11 and going through the body II until the barb 55 protrudes from the top of the body 11, thereby placing the fish catching system 50 in a first or unmanipulated position. Finally, the angler inserts the barb 55 into the end portion 31 of the barb guard 30 to cover the barb 55 and thus prevent the hook 51 from snagging on underwater plants and debris common in places where game fish hide.

When rigged as described above, the angler casts the fish catching system 50 into a body of water and permits the fish catching system 50 to sink to a desired depth, where it resides in the first or unmanipulated position. Once at the desired depth, the fish catching system 50 permits the angler to move the lure 10 without having to retrieve the fishing line 70 utilizing the reel. The angler grasps the fishing line 70 and pulls it a limited distance, resulting in the shaft 52 of the hook 51 passing forward through the passageway 59 of the lure manipulator 56. Alternatively, the angler may move the rod to facilitate the passing forward of the shaft 52 through the passageway 59. The shaft 52 passes forward through the passageway 59 until the lure retainer 58 contacts the collar 62, thereby compressing the tail 12 of the lure 10 underneath the body 11 and moving the fish catching system 50 into a second or manipulated position.

Upon reaching the second or manipulated position, the angler looses the tension in the fishing line 70, allowing the release of elastic energy stored in the tail 12 of the lure 10 due to its compression and facilitating the return of the shaft 52 rearward through the passageway 59. The shaft 52 passes rearward through the passageway 59 until the eyelet 53 of the hook 51 abuts the head 57 of the lure manipulator 56, thereby uncompressing the tail 12 of the lure 10 and moving the fish catching system 50 into its first or unmanipulated position.

In moving back and forth between the first or unmanipulated position and the second or manipulated position, the tail 12 of the lure 10 compresses and releases to simulate a swimming decapod in the body of water. In systematically moving the tail 12 of the lure 10, the angler attempts to attract a game fish's attention resulting in a strike upon the lure 10 and the subsequent hooking of the game fish via the hook 51. The barb guard 30 does not interfere with a game fish strike as the strike causes the barb 55 to dislodge from the barb guard 30. After moving the tail 12 of the lure 10 in place, the angler still has the option of reeling the fish catching system 50 to a new location before again moving the tail 12 of the lure 10. The angler repeats the foregoing procedure until a game fish strikes or the fish catching system 50 has been retrieved completely.

The fish catching system 50 is an improvement in attracting game fish because, when attached by a fishing line to a fishing rod and reel, an angler may work the lure 10 to appear the same as a live decapod traveling through the water. In working the fish catching system 50 as described above, the angler manipulates the lure 10 such that it appears as a decapod traveling through the water because live decapods travel backwards using their tails as the means of propulsion. Accordingly, the fish catching system 50 attracts game fish because it presents game fish with prey that both looks and acts identical to their staple food of decapods.

Figure 2:
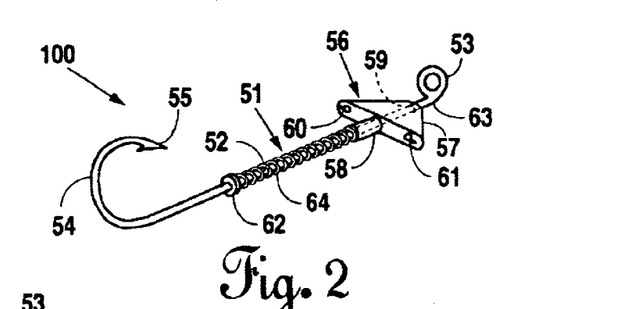
FIG. 2 is a perspective view illustrating a lure manipulator according to a second embodiment of a fish catching system.

As illustrated in FIG. 2, a second embodiment of a fish catching system 100 is similar in design and operation to the fish catching system 50, and like parts have been labeled with like numerals. The fish catching system 100 differs from the fish catching system 50 in that it includes a spring 64 residing on the shaft 52 of the hook 51 between the collar 62 and the lure manipulator 56. The spring 64 provides a biasing force that aids in returning the lure 10 from its second or manipulated position to its first or unmanipulated position.

Figure 3:
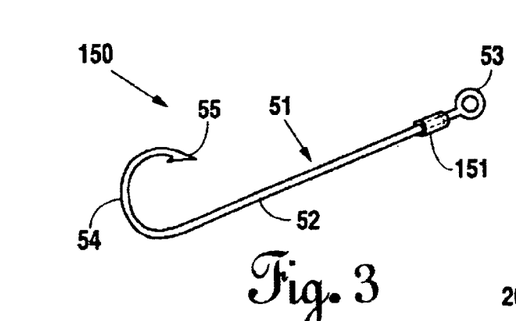
FIG. 3 is a perspective view illustrating a lure manipulator according to a third embodiment of a fish catching system.

As illustrated in FIG. 3, a third embodiment of a fish catching system 150 is similar in design and operation to the fish catching system 50, and like parts have been labeled with like numerals. The fish catching system 150 differs from the fish catching system 50 in that the collar 62 is removed and the lure manipulator 56 comprises a sleeve 151 movable along the shaft 52 of the hook 51. Attachment of the lure 10 occurs through the driving of the tail fan 20 onto the sleeve 151 followed by the securing of the hook 51 to the body 11 of the lure 10 as previously described. In addition the fish catching system 150 may include lures different from the lure 10, such as for example a plastic worm. A plastic worm is attached through driving the head of the plastic worm onto the sleeve 151 followed by the securing of the hook 51 to the body of the plastic worm, thereby permitting the manipulation of the tail of the plastic worm.

Figure 4:
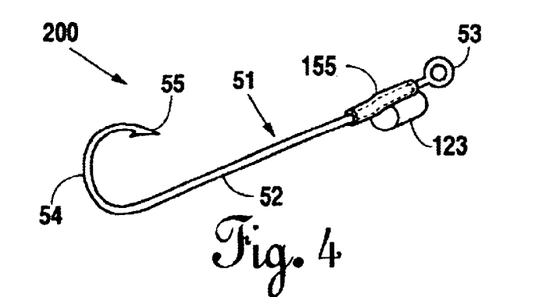
FIG. 4 is a perspective view illustrating a lure manipulator according to a fourth embodiment of a fish catching system.

As illustrated in FIG. 4, a fourth embodiment of a fish catching system 200 is similar in design and operation to the fish catching system 50, and like parts have been labeled with like numerals. The fish catching system 200 differs from the fish catching system 50 in that the collar 62 is removed and the lure manipulator 56 comprises a sleeve 155 movable along the shaft 52 of the hook 51 and having a weight 123 attached thereto. Attachment of the lure 10 occurs through the driving of the tail fan 20 onto the sleeve 155 followed by the securing of the hook 51 to the body 11 of the lure 10 as previously described. In addition the fish catching system 200 may include lures different from the lure 10, such as for example a plastic worm. A plastic worm is attached through driving the head of the plastic worm onto the sleeve 155 followed by the securing of the hook 51 to the body of the plastic worm, thereby permitting the manipulation of the tail of the plastic worm.

Figure 5:
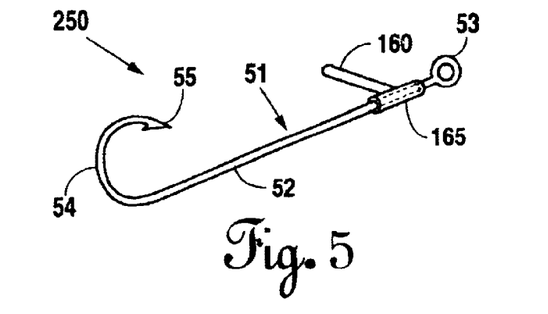
FIG. 5 is a perspective view illustrating a lure manipulator according to a fifth embodiment of a fish catching system.

As illustrated in FIG. 5, a fifth embodiment of a fish catching system 250 is similar in design and operation to the fish catching system 50, and like parts have been labeled with like numerals. The fish catching system 250 differs from the fish catching system 50 in that the collar 62 is removed and the lure manipulator 56 comprises a sleeve 165 movable along the shaft 52 of the hook 51 and having a post 160 attached thereto. Attachment of the lure 10 occurs through the driving of the tail fan 20 onto the post 160 followed by the securing of the hook 51 to the body 11 of the lure 10 as previously described. In addition the fish catching system 250 may include lures different from the lure 10, such as for example a plastic worm. A plastic worm is attached through driving the head of the plastic worm onto the post 165 followed by the securing of the hook 51 to the body of the plastic worm, thereby permitting the manipulation of the tail of the plastic worm.

Figure 6A:
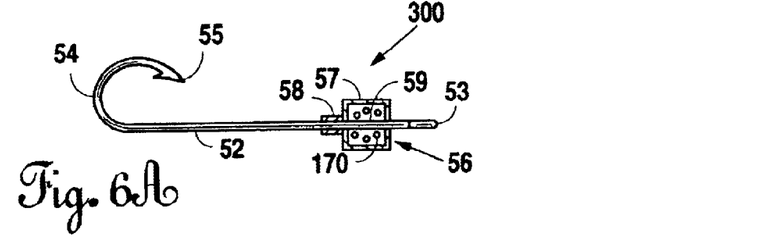
FIG. 6A is a side elevation view illustrating a lure manipulator according to a sixth embodiment of a fish catching system.
Figure 6B:
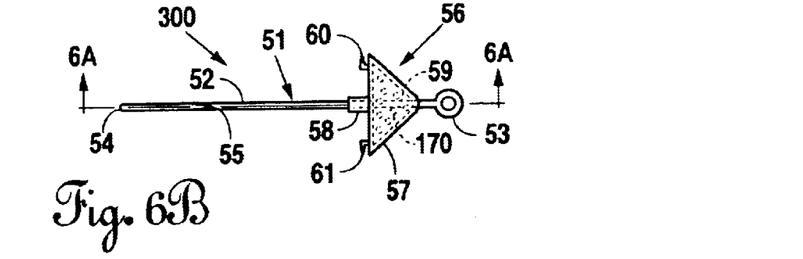
FIG. 6B is a top plan view illustrating the lure manipulator according to the sixth embodiment of a fish catching system.

As illustrated in FIGS. 6A and B, a sixth embodiment of a fish catching system 300 is similar in design and operation to the fish catching system 50, and like parts have been labeled with like numerals. The fish catching system 300 differs from the fish catching system 50 in that the collar 62 is removed and the lure manipulator 56 is hollow to accommodate therein a noisemaker, such as beads 170. The beads 170 produce a rattling sound responsive to the movement of the entire fish catching system 300 or the movement of the lure manipulator 56 as the lure 10 travels from its first or unmanipulated position to its second or manipulated position so as to attract game fish that respond to sound.

Figure 8A:
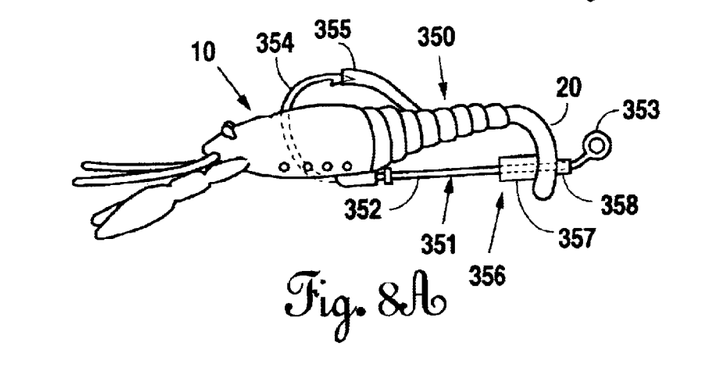
FIG. 8A is a side elevation view illustrating a lure manipulator according to a seventh embodiment of a fish catching system, including a lure.
Figure 8B:
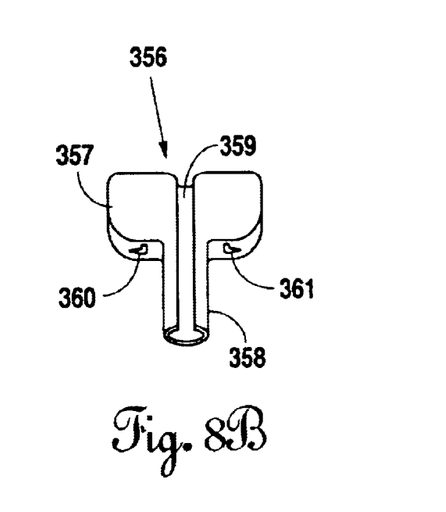
FIG. 8B is a bottom plan view illustrating a lure manipulator according to the seventh embodiment of a fish catching system.

As illustrated in FIGS. 8A and B, a seventh embodiment of a fish catching system 350 includes a hook 351 having a shaft 352 terminating in an eyelet 353 at a first end and a curvature 354 terminating in a barb 355. Although this embodiment discloses a hook 351 including a single barb 355, those of ordinary skill in the art will recognize that any hook, such as a treble hook, may be substituted.

The fish catching system 350 further includes a lure manipulator 356. The lure manipulator 356 includes a lure retainer 358, a head 357 secured to or formed integrally with the lure retainer 356, and a slot 359 through the head 357 and the lure retainer 358. The lure manipulator 356 may further include lure-retaining posts 360 and 361 secured to or integrally formed with the head 357. The slot 359 permits the securing of the lure manipulator 356 about the shaft 352 of the hook 351. Particularly, the shaft 352 of the hook 351 is placed within the slot 359 and the lure manipulator 356 is squeezed such that the constriction of the slot 359 secures the lure manipulator 356 about the shaft 352 of the hook 351. The slot 359 is sized such that the lure manipulator 356 slides freely along the shaft 352 of the hook 351. The lure retainer 356 may include any device, such as concentric flanges, a barb, or other detent, that receives a lure thereon but prevents dislodgment of the lure during the use of the lure manipulator 356. The lure manipulator 356 may be constructed from any suitable material, such as lead, metal, hard plastic, or the like.

The fish catching system 350 includes a lure manipulator 356 with a slot 359 to provide the fish catching system 350 with the capability of using different lure manipulators 356. The lure manipulators 356 may be of different weights, shapes, sizes, and the like to accommodate variable fishing conditions. Illustratively, when fishing in shallow water, a lightweight lure manipulator 356 may be secured to the hook 351 so that, when cast into a body of water, the fish catching system 350 resides atop grasses and weeds. In deeper water, a heavier lure manipulator 356 may be secured to the hook 351 so that, when cast into a body of water, the fish catching system 350 sinks to a depth suitable for fishing in such waters.

The fish catching system 350 further includes a lure manipulator 356 with the head 357 positioned interior to the lure retainer 358 so that the head 357 is hidden underneath a lure. This provides the advantage of a more realistic appearing bait, as the head cannot be seen by a game fish observing the fish catching system 350. In this seventh embodiment, the fish catching system 350 includes a lure 10 as previously described in the first embodiment with reference to FIGS. 7 and 9.

Figure 11:
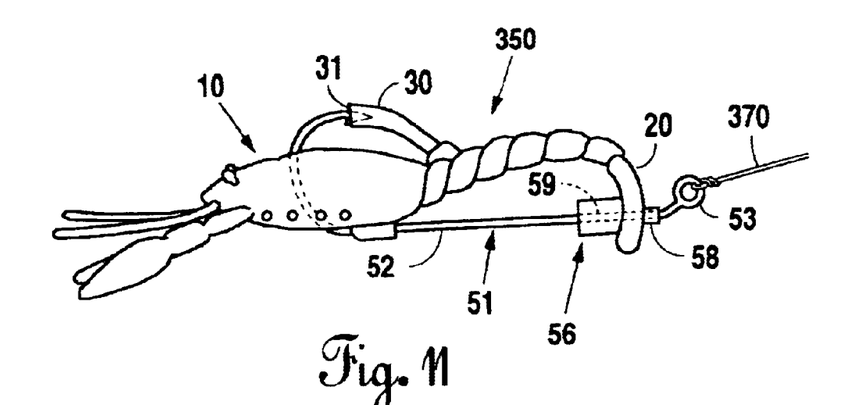
FIG. 11 is a side elevation view illustrating the lure manipulator according to the seventh embodiment of a fish catching system, including a lure in a first or unmanipulated position.
Figure 12:
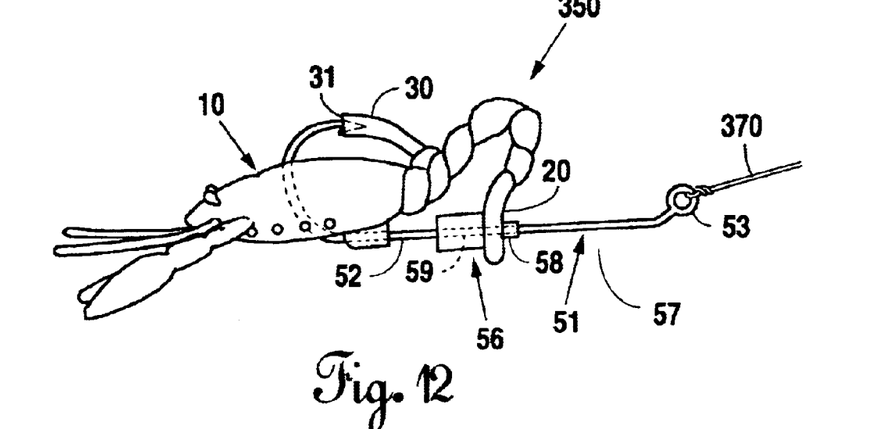
FIG. 12 is a side elevation view illustrating the lure manipulator according to the seventh embodiment of a fish catching system, including a lure in a second or manipulated position.

In use as illustrated in FIGS. 11 and 12, an angler attaches a fishing line 370 supported on a rod and reel to the eyelet 353 of the hook 351. The angler then secures the tail fan 20 of the lure 10 to the hook 351 such that the tail fan 20 resides adjacent the eyelet 353. The angler further places the shaft 352 of the hook 351 within the slot 359 of the desired lure manipulator 356 and constricts the lure manipulator 356, thereby affixing the lure manipulator 356 to the shaft 352. Next, the angler drives the lure retainer 358 of the lure manipulator 356 through the tail fan 20 of the lure 10 and inserts the lure-retaining posts 360 and 361 of the lure manipulator 356 into the tail fan 20 of the lure 10. In addition, the angler inserts the hook 351 through the body 11 of the lure 10 starting underneath the body 11 and going through the body 11 until the barb 355 protrudes from the top of the body 11, thereby placing the fish catching system 350 in a first or unmanipulated position. Finally, the angler inserts the barb 55 into the end portion 31 of the barb guard 30 to cover the barb 355 and thus prevent the hook 351 from snagging on underwater plants and debris common in places where game fish hide.

When rigged as described above, the angler casts the fish catching system 350 into a body of water and permits the fish catching system 350 to sink to a desired depth, depending on the selected lure manipulator, where it resides in the first or unmanipulated position. Once at the desired depth, the fish catching system 350 permits the angler to move the lure 10 without having to retrieve the fishing line 370 utilizing the reel. The angler grasps the fishing line 370 and pulls it a limited distance, resulting in the shaft 352 of the hook 351 passing forward through the slot 359 of the lure manipulator 356. Alternatively, the angler may move the rod to facilitate the passing forward of the shaft 352 through the passageway 359. The shaft 352 passes forward through the passageway 359 until the head 357 contacts the body 11 of the lure 10, thereby compressing the tail 12 of the lure 10 underneath the body 11 and moving the fish catching system 350 into a second or manipulated position.

Upon reaching the second or manipulated position, the angler looses the tension in the fishing line 370, allowing the release of elastic energy stored in the tail 12 of the lure 10 due to its compression and facilitating the return of the shaft 352 rearward through the slot 359. The shaft 352 passes rearward through the passageway 359 until the eyelet 353 of the hook 351 abuts the tail fan 20, thereby uncompressing the tail 12 of the lure 10 and moving the fish catching system 350 into its first or unmanipulated position.

In moving back and forth between the first or unmanipulated position and the second or manipulated position, the tail 12 of the lure 10 compresses and releases to simulate a swimming decapod in the body of water. In systematically moving the tail 12 of the lure 10, the angler attempts to attract a game fish's attention resulting in a strike upon the lure 10 and the subsequent hooking of the game fish via the hook 351. The barb guard 30 does not interfere with a game fish strike as the strike causes the barb 355 to dislodge from the barb guard 30. After moving the tail 12 of the lure 10 in place, the angler still has the option of reeling the fish catching system 350 to a new location before again moving the tail 12 of the lure 10. The angler repeats the foregoing procedure until a game fish strikes or the fish catching system 350 has been retrieved completely.

The fish catching system 350 is an improvement in attracting game fish because the multiple lure manipulators 356 permit use of the fish catching system 350 under a variety of fishing conditions. Further, placement of the head 357 of the lure manipulator 356 underneath the tail 12 of the lure 10 produces a realistic appearing bait. In addition, when attached by a fishing line to a fishing rod and reel, an angler may work the lure 10 to appear the same as a live decapod traveling through the water. In working the fish catching system 350 as described above, the angler manipulates the lure 10 such that it appears as a decapod traveling through the water because live decapods travel backwards using their tails as the means of propulsion. Accordingly, the fish catching system 350 attracts game fish because it presents game fish with prey that both looks and acts identical to their staple food of decapods.

Figure 10:
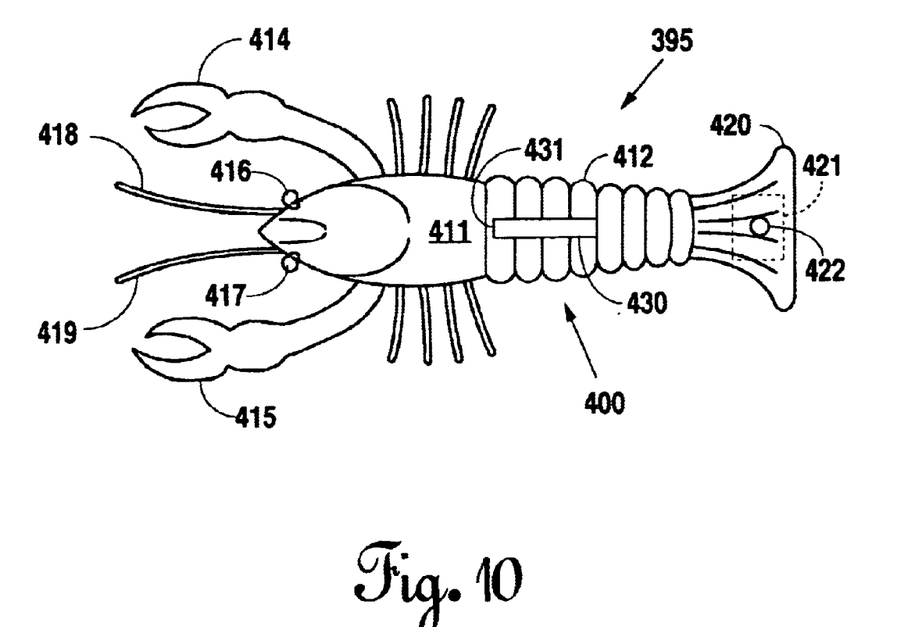
FIG. 10 is a top plan view illustrating an eighth embodiment of a fish catching system.

As illustrated in FIG. 10, an eighth embodiment of a fish catching system 395 includes a lure 400. The lure 400 provides both the proper shape and coloring exhibited by a decapod, such as a shrimp, crawfish, lobster, and the like. The lure 400 in this eighth embodiment is constructed from soft plastic or any suitably malleable material.

The lure 400 includes a body 411 and a tail 412. The body 411 includes claws 414 and 415 and antennae 418 and 419, which are both formed integrally at a front portion thereof. The body further includes eyes 416 and 417 attached at a front portion of thereof. The tail 412 includes a tail fan 420 at the rear thereof. The tail fan 20 may be formed integrally with the tail 412 or, alternatively, attach thereto using any suitable means, such as clips, hooks, or the like, to permit the use of the tail fan 420 with different bodies 411 and tails 412. The tail fan 420 encloses a weight 421 that facilitates movement of the tail 412. The tail fan 420 and the weight 421 include an aperture 422 sized to permit the passing of a hook therethrough. Alternatively, the tail fan 420 could be formed from a material that provides weight to the tail fan 420. The body 411 and the tail 412, including the claws 414 and 415, antennae 418 and 419, and the eyes 416 and 417, provide the lure 400 with a shape identical to a decapod. Further, the color of the body 411 and the tail 412, including the claws 414 and 415, antennae 418 and 419, and the eyes 416 and 417, resemble that of a decapod or any other color scheme suitable to attract game fish.

The lure 400 further includes a barb guard 430 formed integrally with lure 400. The barb guard 430 includes an end portion 431 that allows for the sheathing of a hook barb. The barb guard 430 therefore covers the hook barb to prevent the hook from snagging on underwater plants and debris common in places where game fish hide.

In use, an angler attaches a fishing line supported on a rod and reel to an eyelet of a hook. The angler then passes the hook through the aperture 422, and inserts the hook through the body 411 of the lure 400 starting underneath the body 411 and going through the body 411 until its barb protrudes from the top of the body 411. Finally, the angler inserts the barb into the end portion 431 of the barb guard 430 to cover the barb and thus prevent the hook from snagging on underwater plants and debris common in places where game fish hide. When rigged as described above, the tail fan 20 slides freely along a shaft of the hook so that the lure 400 simulates a swimming decapod when cast into a body of water.

Figure 13:
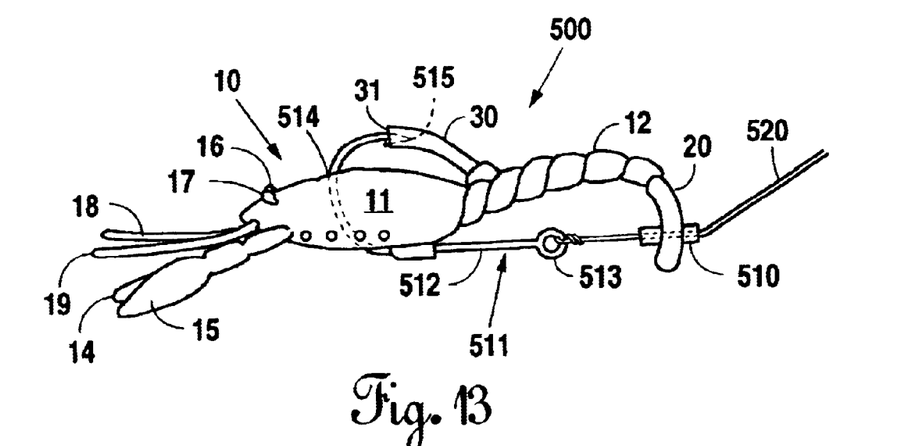
FIG. 13 is a side elevation view illustrating a lure manipulator according to a ninth embodiment of a fish catching system, including a lure.

As illustrated in FIG. 13, a ninth embodiment of a fish catching system 500 includes a sleeve 510 and a hook 511 having a shaft 512 terminating in an eyelet 513 at a first end and a curvature 514 terminating in a barb 515. Although this embodiment discloses a hook 511 including a single barb 515, those of ordinary skill in the art will recognize that any hook, such as a treble hook, may be substituted. The fish catching system 350 further includes a lure 10 as previously described in the first embodiment with reference to FIGS. 7 and 9.

In use, an angler drives the sleeve 510 through the tail fan 20 of the lure 10. The angler then passes a fishing line 520 supported on a rod and reel through the sleeve 510 and attaches the fishing line 520 to the eyelet 513 of the hook 511. Next, the angler inserts the hook 511 through the body 11 of the lure 10 starting underneath the body 11 and going through the body 11 until the barb 515 protrudes from the top of the body 11. Finally, the angler inserts the barb 515 into the end portion 31 of the barb guard 30 to cover the barb 515 and thus prevent the hook 511 from snagging on underwater plants and debris common in places where game fish hide. When rigged as described above, the sleeve 510 and thus the tail fan 20 slides freely along the fishing line 520 so that the lure 10 simulates a swimming decapod when cast into a body of water.

Figure 14:
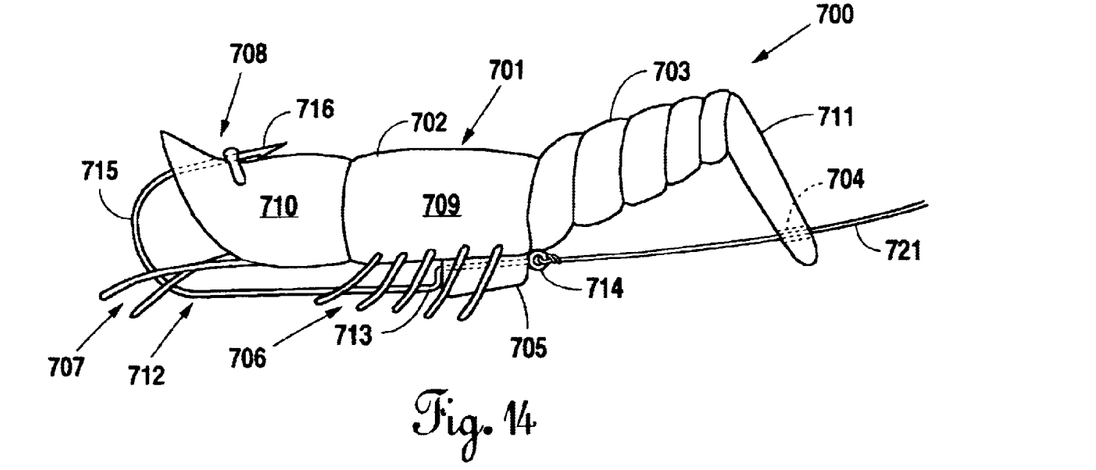
FIG. 14 is a side elevation view illustrating a tenth embodiment of a fish catching system.
Figure 15:
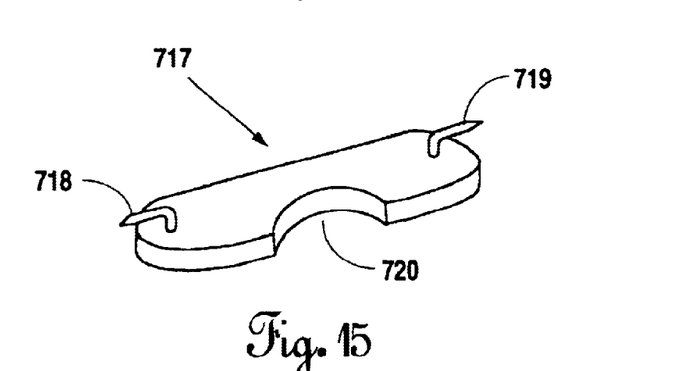
FIG. 15 is a perspective view illustrating a weight for the tenth embodiment of a fish catching system.
Figure 16:
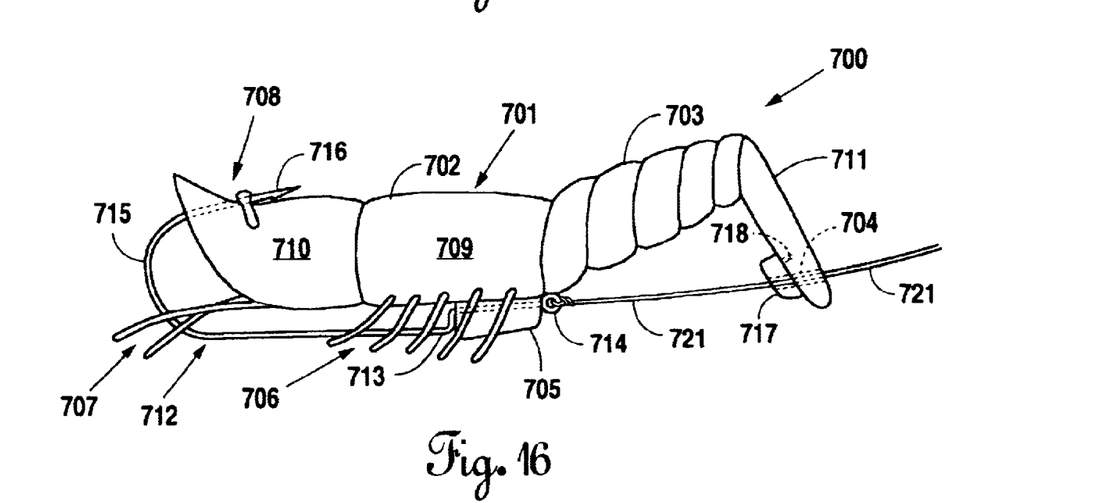
FIG. 16 is a side elevation view illustrating the tenth embodiment of a fish catching system including the weight attached thereto.

As illustrated in FIGS. 14–16, a fish catching system 700 includes a lure 701. The lure 701 includes a body 702 and a tail 703 having an aperture 704 therethrough. The lure 701 further includes a hook securing member 705 located underneath the body 702. The lure 701 still further includes legs 706, antennae 707, and eyes 708. The body 702 includes a torso portion 709 and a head portion 710. The tail 703 includes a tail fan 711 at an end thereof.

The fish catching system 700 further includes a hook 712 having a shaft 713 terminating in an eyelet 714 at a first end and a curvature 715 terminating in a barb 716. Although this tenth embodiment discloses a hook 712 including a single barb 716, those of ordinary skill in the art will recognize that any hook, such as a treble hook, may be substituted.

The fish catching system 700 still further includes a weight 717. The weight 717 includes securing pins 718 and 719 that permit attachment of the weight 717 to the tail 703 of the lure 701 and, in particular, permit attachment of the weight 717 to the tail fan 711 of the tail 703. While the weight 717 includes securing pins 718 and 719, those of ordinary skill in the art will recognize that only one securing pin is necessary and that more than two may also be used. The weight 717 in this tenth embodiment is shaped to fit unexposed underneath the tail 703 and includes an opening 720. The weight 717 may be constructed from any suitable material, such as lead, metal, hard plastic, or the like.

The fish catching system 700 may be fished as a top water system or may be suitably weighted for fishing beneath the surface of a body of water. In use, an angler attaches a fishing line 721 supported on a rod and reel to the eyelet 714 of the hook 712. The angler then passes the hook 712 completely through the aperture 704 of the tail 703 of the lure 701 such that the fishing line 721 resides through the aperture 704. Alternatively, the angler could first pass fishing line 721 through the aperture 704 prior to securing the fishing line 721 to the eyelet 714. However, when both the fishing line 721 and the hook 712 pass through the aperture 704, different ones of lure 701 may be substituted without the necessity of removing the fishing line 721 from the hook 712. Next, the angler passes the hook 712 through the hook securing member 705 until the eyelet 714 resides adjacent the hook securing member 705. Finally, the angler inserts the hook 712 through the body 702 of the lure 701 until the barb 716 protrudes from the top of the body 702, thereby placing the fish catching system 700 in a first or unmanipulated position.

The foregoing rigging of the fish catching system 700 is for top water fishing in that the buoyancy of the lure 701 maintains the fish catching system at or near the top surface of a body of water. For fishing the fish catching system 700 beneath the surface of a body of water a hook 712 may be selected with sufficient weight to overcome the buoyancy of the lure 701, thereby causing the fish catching system 700 to sink below the surface of a body of water. Alternatively, the weight 717 may be attached to the tail 703 of the lure 701 to overcome the buoyancy of the lure 701, thereby causing the fish catching system 700 to sink below the surface of a body of water. Particularly, the weight 717 is positioned interior of the tail 703 and, more particularly, interior of the tail fan 711 in a location above the fishing line 721 such that the fishing line 721 resides in the opening 720. The securing pins 718 and 719 are then driven into the tail 703 or, more particularly, into the tail fan 711 to mount the weight 717 to the tail 703. While the weight 717 includes the opening 720 as the opening 720 allows placement of the weight close to the fishing line 721, those of ordinary skill in the art will recognize that a weight without an opening would still be mountable to the tail 703 of the lure 701. The fish catching system 700 includes weights 717 each with a different mass that sinks the lure 701 to different depths within a body of water.

When rigged as described above, the angler casts the fish catching system 700 into a body of water and permits the fish catching system 700 to remain at or near the surface of a body of water or to sink to a desired depth, where the fish catching system resides in the first or unmanipulated position. Once at the surface or desired depth, the fish catching system 700 permits the angler to work the lure 701 in a manner that identically simulates movement of a live decapod. The lure 701 resides in the water with the tail 703 pointed toward the angler due to the rigging of the fish catching system 700. Consequently, when the angler moves the rod or reels in some of the fishing line 721, the lure 701 travels towards the angler with the tail 703 leading the way. As the lure 701 moves through the water towards the angler, the pressure of the water against the tail 703 slides the tail 703 along the fishing line 721 and compresses the tail 703 underneath the body 702, thereby moving the fish catching system 700 into a second or manipulated position. Upon reaching the second or manipulated position, the angler ceases movement of the rod or stops reeling in some of the fishing line 721. This allows the release of the elastic energy stored in the tail 703 of the lure 701 due to its compression underneath the body 702. As a result, the tail 703 returns to the first or unmanipulated position of the fish catching system 700.

In moving back and forth between the first or unmanipulated position and the second or manipulated position, the tail 703 of the lure 701 compresses and releases to simulate a swimming decapod in the body of water. In systematically moving the tail 703 of the lure 701, the angler attempts to attract a game fish's attention resulting in a strike upon the lure 701 and the subsequent hooking of the game fish via the hook 712. The angler repeats the foregoing procedure until a game fish strikes or the fish catching system 700 has been retrieved completely.

The aperture 704 of the tail 703 provides the advantage of permitting the angler to set the hook 712 in the mouth of the game fish without the necessity of the lure 701 partially exiting the mouth of the game fish, which often results in lost game fish. Illustratively, upon the strike of a game fish, the angler pulls on the rod in an attempt to set the hook 712. As the game fish holds the lure 701, the lure 701 remains within the mouth of the game fish and only the hook 712 moves towards the aperture 704 and even passes through the aperture 704 if necessary. This movement of the hook 712 consequently pivots and compresses the lure 701 within mouth of the game fish, thereby permitting the hook 712 to hook the mouth of the game fish without the necessity of the lure 701 partially exiting the mouth of the game fish.

Furthermore, the opening 720 in the weight 717 provides the advantage of permitting the angler to set the hook 712 in the mouth of the game fish without the necessity of the weight 717 exiting the mouth of the game fish, which often results in lost game fish. Illustratively, upon the strike of a game fish, the angler pulls on the rod in an attempt to set the hook 712. As the game fish holds the lure 701, the lure 701 including the weight 717 remains within the mouth of the game fish and only the hook 712 moves towards the opening 720 and the aperture 704 and even passes through the opening 720 and the aperture 704 if necessary. This movement of the hook 712 consequently pivots and compresses the lure 701 within mouth of the game fish, thereby permitting the hook 712 to hook the mouth of the game fish without the necessity of the weight 717 exiting the mouth of the game fish.

The fish catching system 700 is an improvement in attracting game fish because it may be used as a top water system and the multiple weights 717 permit use of the fish catching system 700 at a variety of depths and under a variety of fishing conditions. Further, when attached by a fishing line to a fishing rod and reel, an angler may work the lure 701 to appear the same as a live decapod traveling through the water. In working the fish catching system 700 as described above, the angler manipulates the lure 701 such that it appears as a decapod traveling through the water because live decapods travel backwards using their tails as the means of propulsion. Accordingly, the fish catching system 700 attracts game fish because it presents game fish with prey that both looks and acts identical to their staple food of decapods.

Although the present invention has been described in terms of the foregoing embodiment, such description has been for exemplary purposes only and, as will be apparent to one of ordinary skill in the art, many alternatives, equivalents, and variations of varying degrees will fall within the scope of the present invention. That scope, accordingly, is not to be limited in any respect by the foregoing description; rather, it is defined only by the claims that follow.

I claim:

1. A fish catching system, comprising a decapod-shaped lure comprising a body and a tail including an aperture therethrough, wherein, in a first position, a hook secures to the body of the decapod-shaped lure and a fishing line passes through the aperture of the tail and secures to the hook, and further wherein pulling the fishing line facilitates movement of the tail underneath the body to place the lure in a second position and releasing the fishing line returns the tail to the first position of the lure.

2. The fish catching system according to claim 1 wherein the decapod-shaped lure further comprises a hook securing member located underneath the body.

3. The fish catching system according to claim 1 wherein the aperture of the tail is adapted to receive the hook and the fishing line therethrough.

4. The fish catching system, comprising a weight mountable to the tail of the lure.

5. The fish catching system according to claim 4, wherein the weight includes a securing pin adapted to attach the weight to the tail of the lure.

6. The fish catching system according to claim 4, wherein the weight includes an opening.

7. A method of fishing, comprising:

providing a decapod-shaped fishing lure comprising a body and a tail including an aperture therethrough;

securing a fishing line to a hook; and passing the hook through the aperture; and securing the hook to the body of the lure such that the fishing line resides through the aperture, thereby placing the lure in a first position.

8. The method of fishing according to claim 7, further comprising:

casting the lure into a body of water;

pulling the fishing line to facilitate movement of the tail underneath the body thereby placing the lure in a second position; and releasing the fishing line thereby returning the tail to the first position of the lure.

9. The method of fishing according to claim 7, further comprising:

selecting a weight dependent upon desired fishing depth; and securing the weight to the lure.

10. The method of fishing according to claim 9, further comprising:

casting the lure into a body of water; and allowing the lure to sink to a desired depth.

11. The method of fishing according to claim 10, further comprising:

pulling the fishing line to facilitate movement of the tail underneath the body thereby placing the lure in a second position; and releasing the fishing line thereby returning the tail to the first position of the lure.

12. A method of fishing, comprising:

providing a decapod-shaped fishing lure comprising a body and a tail including an aperture therethrough;

passing a fishing line through the aperture;

securing the fishing line to a hook;

securing the hook to the body of the lure, thereby placing the lure in a first position;

casting the lure into a body of water;

pulling the fishing line to facilitate movement of the tail underneath the body thereby placing the lure in a second position; and releasing the fishing line thereby returning the tail to the first position of the lure.

13. A method of fishing, comprising:

providing a decapod-shaped fishing lure comprising a body and a tail including an aperture therethrough;

passing a fishing line through the aperture;

securing the fishing line to a hook;

securing the hook to the body of the lure, thereby placing the lure in a first positions;

selecting a weight dependent upon desired fishing depth; and securing the weight to the tail of the lure.

14. The method of fishing according to claim 13, further comprising:

casting the lure into a body of water; and allowing the lure to sink to a desired depth.

15. The method of fishing according to claim 14, further comprising:

pulling the fishing line to facilitate movement of the tail underneath the body thereby placing the lure in a second position; and releasing the fishing line thereby returning the tail to the first position of the lure.

* * * * *